United States Patent [19]

Mertwoy et al.

[11] 4,195,144

[45] Mar. 25, 1980

[54] COPOLYMERS OF ALPHA-N-ALKYLSTYRENES AND STYRENE

[75] Inventors: Helen E. Mertwoy, Dresher; Henry Gisser, Philadelphia, both of Pa.

[73] Assignee: The United States of America as represented by the Secretary of the Army, Washington, D.C.

[21] Appl. No.: 952,873

[22] Filed: Oct. 19, 1978

[51] Int. Cl.$^2$ ........................................... C08F 212/08
[52] U.S. Cl. ...................................... 526/173; 252/9; 252/12; 260/33.6 UA; 526/218; 526/232.1; 526/347
[58] Field of Search ................... 526/347, 347.1, 173, 526/218, 232.1

[56] References Cited

U.S. PATENT DOCUMENTS

| | | |
|---|---|---|
| 2,448,976 | 9/1948 | Heligmann . |
| 3,139,416 | 6/1964 | Lumb et al. . |
| 3,169,948 | 2/1965 | Hardy . |
| 4,016,348 | 4/1977 | Adams .............................. 526/347 |

Primary Examiner—Harry Wong, Jr.
Attorney, Agent, or Firm—Nathan Edelberg; Robert P. Gibson; A. Victor Erkkila

[57] ABSTRACT

There is described novel copolymers of styrene and alpha-n-alkylstyrenes containing at least eleven carbon atoms in the alkyl group. The copolymers, which contain at least 20 mole percent of the alpha-n-alkylstyrenes, are solids and have greater durability with lower coefficients of friction than comparable styrene homopolymers. The copolymers are produced by anionic initiated copolymerization using metallic sodium as the catalyst or by radical initiated copolymerization using benzoyl peroxide or azobisisobutyronitrile as the catalyst.

9 Claims, 2 Drawing Figures

COPOLYMERS OF ALPHA-N-ALKYLSTYRENES AND STYRENE

GOVERNMENT RIGHTS

The invention described herein may be manufactured, used and licensed by the Government for Governmental purposes without the payment to us of any royalties thereon.

BRIEF DESCRIPTION OF THE INVENTION

This invention relates to novel copolymers of styrene and alpha-n-alkylstyrenes containing at least eleven carbon atoms in the alkyl group. Those copolymers of the invention which contain at least 20 mole percent of the alpha-n-alkylstyrenes are solids and have greater durability with lower coefficients of friction than a comparable styrene homopolymer. The copolymers of this invention can be produced by an anionic initiated copolymerization using metallic sodium as a catalyst or by a radical initiated copolymerization using benzoyl peroxide or azobisisobutyronitrile (AIBN) as the catalyst.

DETAILED DESCRIPTION OF THE INVENTION

The present invention is based on the discovery that alpha-n-alkylstyrenes represented by the formula

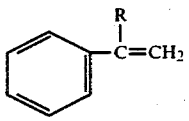

wherein R is a straight chain alkyl having at least eleven carbon atoms, can be polymerized with styrenes to form copolymers having advantageous properties.

The copolymers of this invention have a range of physical properties depending on the molecular weight, the number of carbons in the alkyl chain, the relative mole proportions of the alpha-n-alkylstyrene and styrene, and the polymerization catalyst used to prepare the copolymers.

The copolymers of this invention change from clear hard to tough rubbery solids as the mole percent of alpha-n-alkylstyrene increases, thus a copolymer containing about 20 mole percent alpha-n-alkylstyrene is a clear, hard solid whereas a copolymer containing about 37 mole percent alpha-n-alkylstyrene is a tough rubbery solid.

Figure 1:
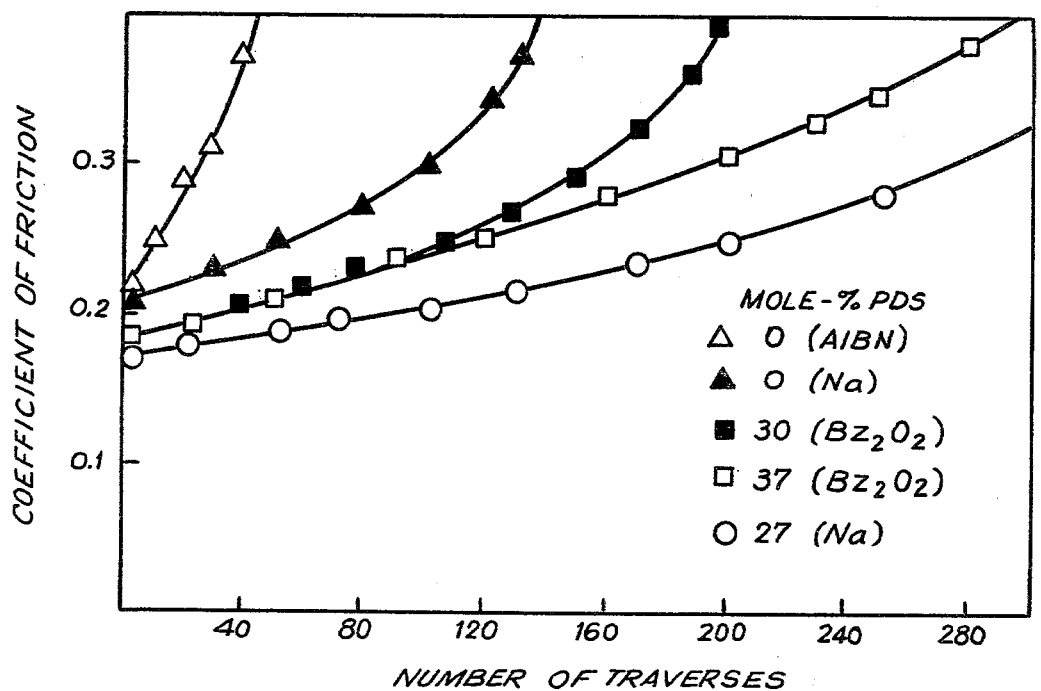
FIG. 1 graphically illustrates the durability of thin films (3700–4000 Å) of copolymers of alpha-n-pentadecylstyrene with styrene, polymerized with different catalysts, on glass; 440C stainless steel rider, load 1000 grams, sliding speed 0.32 cm/sec.
Figure 2:
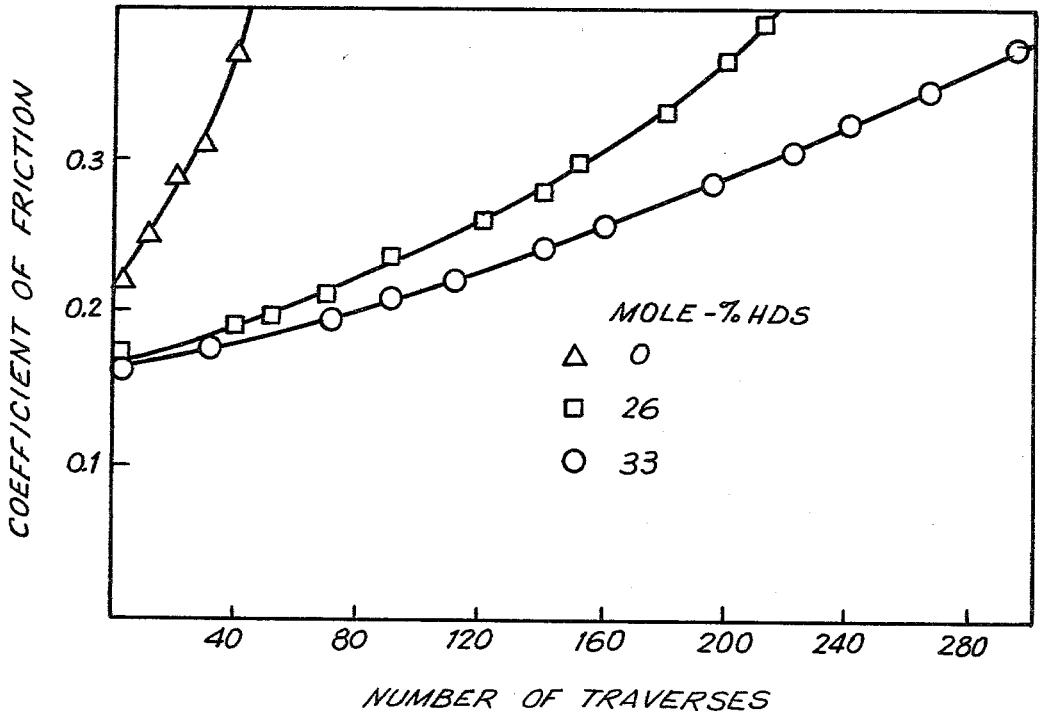
FIG. 2 graphically illustrates the durability of thin films (3700–4000 Å) of copolymers of alpha-n-heptadecyl styrene with styrene, polymerized with AIBN, on glass; 440C stainless steel rider, load 1000 grams, sliding speed 0.37 cm/sec.

The coefficient of friction and durability of the copolymers are superior to comparable polystyrenes. As the mole percent of the alpha-n-alkylstyrene in the copolymer increases, the coefficient of friction becomes lower. In addition, in general the durability increases. However, as shown in FIGS. 1 and 2 copolymers containing about 27 mole percent alpha-n-alkylstyrene which are prepared by anionic initiated copolymerization have greater durability than copolymers prepared by free radical initiated copolymerization having greater mole percent of alpha-n-alkylstyrene.

The copolymers are soluble in aromatic hydrocarbons and chloroform. Unlike polystyrene, they are also soluble in cold aliphatic hydrocarbons, such as heptane and hexadecane.

While copolymers with all mole percent ratios of styrene and alpha-n-alkylstyrenes having at least eleven carbon atoms in the alkyl group are contemplated as being within the scope of this invention, those having from about 20 mole percent to about 40 mole percent of alpha-n-alkylstyrenes having at least eleven carbon atoms in the alkyl are preferred. More preferred are those having about 25 to 40 mole percent of alpha-n-alkylstyrenes with at least eleven carbon atoms in the alkyl group.

The number of carbon atoms in the alkyl group which exceeds eleven is not critical to the operability of the invention until the number is so large that polymerization time is extended beyond practicality or polymerization does not take place. This ordinarily occurs when the number of carbon atoms reaches about 24.

The most preferred copolymers of this invention are those having about 25 mole percent of alpha-n-alkylstyrene having from 15 to 17 carbon atoms in the alkyl group.

The copolymers of this invention can be used as solid lubricants, friction reducing additives for lubricants, or as mechanical parts subject to friction and wear, such as gears.

The copolymers of this invention can be prepared by anionic copolymerization using metallic sodium as the catalyst. This reaction is conveniently carried out in a non-reactive solvent at cold temperatures, e.g., of about 0°–10° Celsius, using as the polymerization initiator an alkali metal or an organo compound of an alkali metal. Preferred for use in the process of this invention is metallic sodium. The preferred solvent for use in this invention is tetrahydrofuran (THF). The reaction times are rather slow because of steric hindrance by the large alpha alkyl group. As the chain length of the alkyl group becomes larger, the polymerization reaction slows down. Normally when the chain length reaches about 24, the time of the reaction becomes impractical. Anionic initiated polymerizations continue as long as the monomers are present and can be extended by adding additional amounts of monomers. The yields and molecular weight of the copolymers produced by anionic initiated polymerization are time dependent. Longer reaction times result in larger molecular weight copolymers. If the reaction time is allowed to proceed for very long times, e.g. over 7 days, then the molecular weight of the product becomes over about 11,000. The reaction can be terminated when the desired copolymer is produced by the addition of a proton donor, e.g. methanol, usually after from about 5 to 7 days. This time can be extended by adding monomer so the reaction occurs for up to about 21 days thus achieving a product having a molecular weight over about 20,000. Yields of this reaction increase if the time period of the reaction in lengthened but become less productive time-wise if the reaction is allowed to proceed more than seven days.

The amount of catalyst needed is very small; generally about 0.3 millimoles of sodium is used.

The copolymers of this invention can also be prepared by radical initiated copolymerization using benzoyl peroxide or AIBN as the polymerization catalyst. The polymerization is conveniently carried out at warm temperatures, e.g. about 60° Celsius using about 0.001 millimoles of AIBN catalyst or about 0.040 to 0.060 millimoles of benzoyl peroxide catalyst.

The polymerization with benzoyl peroxide as the catalyst is generally completed after about 21 days, yielding copolymers with about 7,000 molecular weight.

The AIBN catalyzed reaction is more efficient and yields, after 14 days, a copolymer with molecular weights from about 17,000 to 23,000 depending on the mole percent of alpha-n-alkylstyrene in the reaction mixture.

In carrying out the copolymerization of styrene with an alpha-n-alkylstyrene defined above using benzoyl peroxide, metallic sodium or azobisisobutyronitrile as the polymerization catalyst, the mole percent of the alpha-n-alkylstyrene reactant in the reaction mixture is preferably from about 30 to about 70.

There is no specific copolymer molecular weight which is preferred in this invention since, within the limits of practicality, the molecular weight can range from about 5,000 to over 30,000. The limiting factors for the molecular weight other than time is the length of the alpha alkyl chain and the polymerization catalyst. When the alpha alkyl chain increases in length its steric hindrance also increases, slowing down the reaction and, in some cases, preventing it from occurring. This normally occurs when the alkyl has more than 24 carbon atoms.

The polymerization catalyst affects both the yields and the molecular weight. Benzoyl peroxide yields relatively low molecular weight copolymers in relatively low yields for a given time period, compared to the AIBN catalyzed reactions. The amount of catalyst also affects the percent conversion of the alkylstyrene. A preferred amount of benzoyl peroxide catalyst is 0.060 millimoles and a preferred amount of AIBN catalyst is 0.001 millimoles.

The preferred catalyst would depend on the desired properties of the copolymer produced and the economics of the reaction. There is no significant differences in the durabilities of the polymers prepared by benzoyl peroxide or AIBN. Durability differences are dependent on the mole percent of the alpha-n-alkylstyrene in the copolymer.

Radical copolymerization reactions are self-terminating and the termination is manifested when there is no apparent change in the viscosity of the contents of the reaction tube. The contents should be a clear very viscous liquid or solid at the reaction termination.

The products from the reaction tube are isolated and purified by dissolving them in an appropriate solvent such as toluene, filtering off impurities, then precipitating the products with methanol, recovering the product and drying to constant weight in a vacuum. This procedure is repeated until the infrared spectra of the copolymers indicates by the absence of absorption bands for olefinic linkages that the copolymer is pure.

The following examples illustrate the invention.

EXAMPLE 1

ANIONIC COPOLYMERIZATION (a) Copolymerization of alpha-n-pentadecylstyrene with styrene was run in solution at 0° C. in a sealed tube using metallic sodium as the catalyst. Tetrahydrofuran (THF) was used as the solvent. The polymerization tube containing the reactants was flushed with nitrogen and evacuated several times before being sealed. The tube was shaken at 0° C. for 7 days. The tube was then opened and just enough methanol was added to terminate the reaction; the solution loses its reddish color at this time.

(b) Copolymerization of alpha-n-heptadecylstyrene with styrene using sodium as a catalyst was run in solution at 0° C. in a sealed tube. Tetrahydrofuran (THF) was used as the solvent. The polymerization tube containing the reactants was flushed with nitrogen and evacuated several times before being sealed. The tube was shaken at 0° C. for 7 days. The tube was then opened and just enough methanol was added to terminate the reaction; the solution loses its reddish color at this time.

The following table illustrates the reaction conditions and results of the anionic copolymerization reaction.

TABLE 1

Anionic Copolymerization of α-n-Alkylstyrene, $CH_2=C(R)C_6H_5$ [$M_1$] with Styrene [$M_2$]
Catalyst: Sodium (0.3mM)[a]; Solvent: THF

| | $M_1$[b] | | $M_2$[c] | | THF | Polym. Temp. | Polym. Time | Conv. | $m_1$[d] | | Analyses[f,g] | | |
|---|---|---|---|---|---|---|---|---|---|---|---|---|---|
| R | mM | mole-% | mM | mole-% | ml | °C. | Days | mole-% | mole-% | $\overline{X}_n$[e] | C % | H % | $\overline{M}_n$[h] |
| $C_{15}H_{31}$ | 3.00 | 50.0 | 3.00 | 50.0 | 2.0 | 0 | 7 | 24.8 | 26.6 | 68 | 89.92 | 9.78 | 11,000 |
| $C_{17}H_{35}$ | 1.17 | 32.9 | 2.39 | 67.1 | 1.4 | 10 | 5 | 65.7 | 20.7 | 28 | 90.30 | 9.41 | 4,310 |
| $C_{17}H_{35}$ | 2.24 | 49.5 | 2.39 | 50.5 | 1.4 | 10 | 5 | 46.9 | 32.3 | 16 | 89.63 | 9.62 | 2,970 |
| H | 0 | 0 | 3.00 | 100 | 0.5 | 0 | 7 | 91.5 | 0 | 48 | 91.93 | 7.83 | 5,039 |

[a]Not all sodium consumed where R = $C_{15}H_{31}$.
[b]Concentration of $M_1$ in initial monomer mixture.
[c]Concentrate of $M_2$ in initial monomer mixture.
[d]Mole-% $M_1$ in copolymer.
[e]Number-average degree of polymerization of microanalyses done by Schwarzkopf Microanalytical Laboratories, Woodside, N.Y.
[f]Where R = H, Calcd. for monomer $C_8H_8$: C, 92.26; H, 7.74; mol. wt., 104.
[h]Determined by vapor pressure osmometry.

EXAMPLE 2

RADICAL COPOLYMERIZATION (a) Benzoyl peroxide copolymerization of alpha-n-pentadecylstyrene with styrene was run in bulk at 60° C. in sealed tubes using benzoyl peroxide as the catalyst. The polymerization tube was flushed with nitrogen and evacuated several times before being sealed. When there was no apparent change in the viscosity of the contents of the polymerization tube, it was assumed that the polymerization was terminated. The contents were a clear viscous fluid or solid at the point of termination.

After the contents of the tube were cooled to room temperature, they were opened.

(b) AIBN (azobisisobutyronitrile)—copolymerization of alpha-n-heptadecylstyrene with styrene using AIBN as the catalyst was run in bulk at 60° C. in sealed tubes. The polymerization tubes were flushed with nitrogen and evacuated several times before being sealed. When there was no apparent change in the viscosity of the contents of the the polymerization tubes, it was assumed that the polymerization was terminated. At this time the contents were a clear, viscous fluid or solid. The tubes were opened after the contents were cooled to room temperature. The table illustrates the various reaction conditions and results.

TABLE III

Coefficients of Friction of Thin Films of Copolymers of a-n-Alkylstyrenes, $CH_2=C(R)C_6H_5$ [$M_1$] with Styrene [$M_2{}^a$]
Substrate: stainless steel, load: 100 gms; sliding speed: 0.04 cm/sec.

| R | $m_1$ mole-% | $m_2$ mole-% | $M_n$ | Catalyst | $\mu$ |
|---|---|---|---|---|---|
| H | | 100 | 5,039 | Sodium | .21 |
| H | | 100 | 50,000 | AIBN | .22 |
| $C_{15}H_{31}$ | 27 | 73 | 11,000 | Sodium | .16 |
| $C_{15}H_{31}$ | 30 | 70 | 7,046 | $Bz_2O_2$ | .16 |
| $C_{15}H_{31}$ | 37 | 63 | 6,950 | $Bz_2O_2$ | .15 |
| $C_{17}H_{35}$ | 26 | 74 | 22,600 | AIBN | .16 |
| $C_{17}H_{35}$ | 33 | 67 | 17,435 | AIBN | .15 |

$^a$Film thickness 3700–4000 Å; 440C stainless steel rider.

TABLE II

Radical Copolymerization of α-n-Alkylstyrene, $CH_2=C(R)C_6H_5[M_1]$, with Styrene [$M_2{}^a$]
Polym. Temp. 60°

| | $M_1{}^b$ | | $M_2{}^c$ | | Cata- | Cata-lyst | Polym. time | Conv. | $m_1{}^d$ | $\overline{X}_n$ | Analyses$^{f,g}$ C | H | $\overline{M}_n{}^h$ |
| R | mM | mole-% | mM | mole-% | lyst | mM | days | mole-% | mole-% | | % | % | |
|---|---|---|---|---|---|---|---|---|---|---|---|---|---|
| $C_{15}H_{31}$ | 3.00 | 50.0 | 3.00 | 50.0 | $Bz_2O_2$ | 0.060 | 21 | 30.3 | 29.7 | 41 | 89.75 | 10.08 | 7,046 |
| $C_{15}H_{31}$ | 3.00 | 66.7 | 1.50 | 33.3 | $Bz_2O_2$ | 0.040 | 21 | 18.1 | 37.1 | 37 | 89.42 | 10.86 | 6,950 |
| $C_{15}H_{31}$ | 3.00 | 100 | 0 | 0 | $Bz_2O_2$ | 0.040 | 21 | 0 | | | | | |
| $C_{17}H_{35}$ | 1.17 | 32.9 | 2.39 | 67.1 | AIBN | 0.001 | 14 | 33.4 | 21.7 | 145 | 90.23 | 9.21 | 22,500 |
| $C_{17}H_{35}$ | 2.34 | 49.5 | 2.39 | 50.5 | AIBN | 0.001 | 14 | 27.7 | 26.5 | 135 | 89.93 | 9.72 | 22,600 |
| $C_{17}H_{35}$ | 2.34 | 59.1 | 1.62 | 40.9 | AIBN | 0.001 | 14 | 23.7 | 32.8 | 96 | 89.60 | 10.28 | 17,435 |
| H | 0 | 0 | 5.50 | 100 | AIBN | 0.001 | 0.8 | 100 | 0 | 481 | 92.06 | 7.93 | 50,000 |

$^a$Reaction run in bulk.
$^b$Concentration of $M_1$ in initial monomer mixture.
$^c$Concentration of $M_2$ in initial monomer mixture.
$^d$mole-% $M_1$ in copolymer.
$^e$Average number degree of polymerization.
$^f$Microanalyses done by Schwarzkopf Microanalytical Laboratories, Woodside, N.Y.
$^g$Where R  H, Calcd. for monomer $C_8H_8$: C, 92.26; H, 7.74; mol. wt., 104.
$^h$Determined by vapor pressure osmometry; where $M_n = 20,000$, error ± 10%.

EXAMPLE 3

IDENTIFICATION OF COPOLYMERS

The copolymers prepared from styrene and alpha-n-pentadecylstyrene and from styrene and alpha-n-heptadecylstyrene were identified by elemental analysis and their infrared spectra. The absorption bands for olefinic linkages at 1799 and 892 (RR'C=CH$_2$) and 1630 cm$^{-1}$ (C$_6$H$_5$C=C) found in infrared spectra of alpha-n-pentadecylstyrene disappeared. A shoulder at 720 cm$^{-1}$, indicating presence of —(CH$_2$)$_n$ where n is equal to or greater than 4, in this case pentadecyl and heptadecyl confirmed the fact that the copolymers contained alpha-n-pentadecylstyrene or alpha-n-heptadecylstyrene units.

EXAMPLE 4

FRICTION STUDIES

Coefficient of friction of the copolymers of alpha-n-pentadecylstyrene and alpha-n-heptadecylstyrene with styrene was determined on a modified Bowden-Leben machine. Measurements were made on thin films (3700–4000 Å) using a ¼" dia. 440C stainless steel ball rider on a stainless steel substrate, a 100 g load and a 0.04 cm/sec. sliding speed. The length of traverse was approximately 0.5 cm. for each measurement. The figures reported are kinetic coefficients of friction. The results of coefficient of friction measurements are shown in Table III. As can be seen in this Table, the coefficient of friction decreases with increasing amounts of alpha-n-pentadecylstyrene or alpha-n-heptadecylstyrene in the copolymer.

EXAMPLE 5

DURABILITY STUDIES

Durability studies of the copolymer of alpha-n-pentadecyl and alpha-n-heptadecylstyrene with styrene were conducted on a Pin on Disc Apparatus. Measurements were made on thin films (3700–4000 Å) using a ¼" dia. 440C stainless steel ball rider, 1000 gram normal load, and 0.37 cm/sec. sliding speed. Coefficient of friction was measured for every traverse over the film during continuous running on a circular track. Traverses were made over the same path until the coefficient of friction increased rapidly or was greater than 0.35.

The results of durability studies are shown in FIGS. 1 and 2. As can be seen from these figures the durability of the copolymers of alpha-n-pentadecylstyrene and alpha-n-heptadecylstyrene with styrene improved as the amount of alpha-n-pentadecylstyrene or alpha-n-heptadecylstyrene in the copolymer increased and also that the polymers with at least 27 mole percent of alpha-n-pentadecylstyrene or 26 mole percent of alpha-n-heptadecylstyrene were superior to polystyrene made by either radical or anionic catalyzed polymerization. The copolymer made with metallic sodium as the copolymerization catalyst appeared to have better properties than those made with benzoyl peroxide catalysts.

We claim:

1. A solid anionic or radical catalyzed copolymer of styrene and an alpha-n-alkylstyrene represented by the formula:

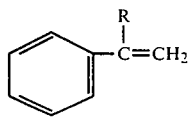

wherein R is a straight chain alkyl having from 11 to 24 carbon atoms, said copolymer having about 20 to about 40 mole percent of the alpha-n-alkylstyrene.

2. The copolymer of claim 1 wherein R is an alkyl having 11 carbon atoms.

3. The copolymer of claim 1 wherein R is an alkyl having 15 carbon atoms.

4. The copolymer of claim 1 wherein R is an alkyl having 17 carbon atoms.

5. The process of preparing a solid copolymer defined in claim 1 by copolymerizing styrene with the alpha-n-alkylstyrene defined in claim 1 which comprises reacting styrene and said alpha-n-alkylstyrene in the presence of a polymerization catalyst selected from the group consisting of benzoyl peroxide, metallic sodium and azobisisobutyronitrile and recovering the product.

6. The process of claim 5 wherein R is an alkyl having 11 carbon atoms.

7. The process of claim 5 wherein R is an alkyl having 15 carbon atoms.

8. The process of claim 5 wherein R is an alkyl having 17 carbon atoms.

9. The process of claims 5, 6, 7 or 8 wherein the mole percent of the alpha-n-alkylstyrene reactant is from about 30 to about 70.

* * * * *